[19] United States Patent
Sekiguchi et al.

[11] Patent Number: 4,663,679
[45] Date of Patent: May 5, 1987

[54] TAPE ADDRESS SYNCHRONIZING APPARATUS FOR VIDEO TAPE RECORDER

[75] Inventors: Toru Sekiguchi; Shigeyuki Kondo, both of Tokyo, Japan

[73] Assignee: NEC Corporation, Japan

[21] Appl. No.: 799,134

[22] Filed: Nov. 18, 1985

[30] Foreign Application Priority Data

Nov. 19, 1984 [JP] Japan ................................ 59-244202

[51] Int. Cl.$^4$ ............................................ G11B 27/32
[52] U.S. Cl. ...................................... 360/73; 360/14.3
[58] Field of Search ..................... 360/14.1, 14.2, 14.3, 360/73

[56] References Cited

U.S. PATENT DOCUMENTS 4,507,691 3/1985 Ishiguro et al. ..................... 360/14.3
4,587,574 5/1986 Tsurubuchi et al. ............... 360/14.3

Primary Examiner—George G. Stellar
Attorney, Agent, or Firm—Ostrolenk, Faber, Gerb & Soffen

[57] ABSTRACT

A tape address synchronizing apparatus for synchronizing the tape position of a video tape recorder to another tape recorder or to a reference has a tape address generating circuit, a reference address generating circuit, comparators for comparing the tape addresses to the reference addresses, a circuit for generating an acceleration signal or a deceleration signal and a capstan servo circuit controlling a motor which in turn controls the speed of the magnetic tape in the tape recorder which is to be synchronized. When the tape addresses match the reference addresses, the phases of a reference signal used for generating the reference addresses and the phase of a CTL signal recorded on the magnetic tape are compared to one another to further synchronize the phases of the signals to one another. As the phase synchronization involves adjustment in tape position and to prevent the phase synchronizing operation from unsynchronizing the tape address from the reference address, the acceleration/deceleration generating circuit is inhibited whenever the difference between the phases is outside a predetermined value range.

8 Claims, 7 Drawing Figures

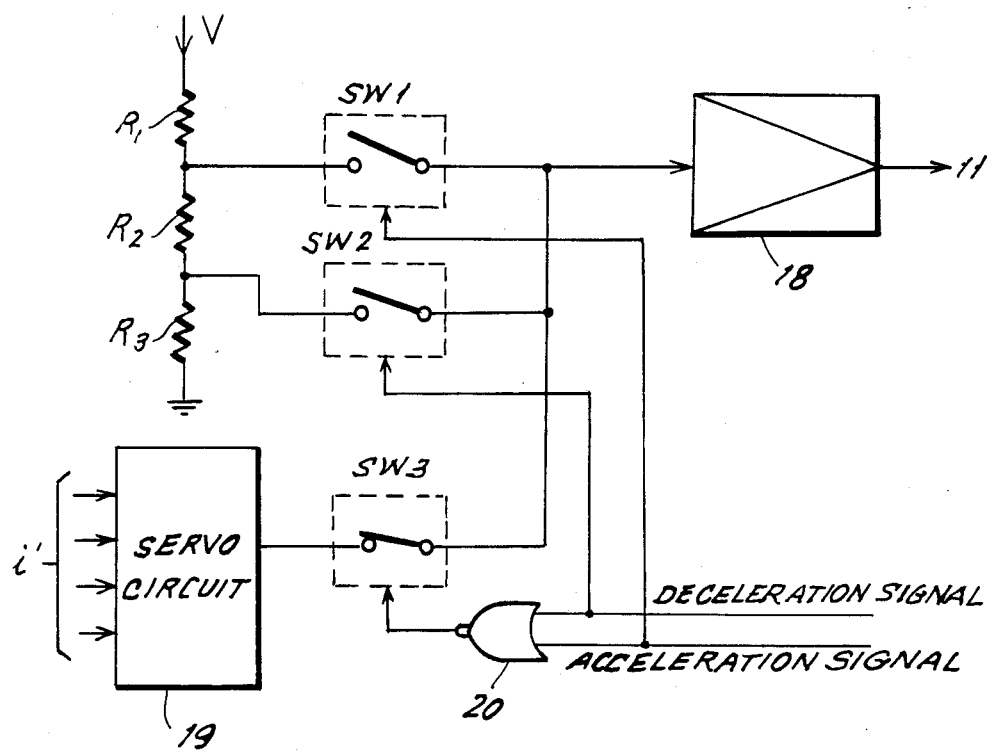

TAPE ADDRESS SYNCHRONIZING APPARATUS FOR VIDEO TAPE RECORDER

BACKGROUND OF THE INVENTION

The present invention relates to a tape address synchronizing apparatus for a video tape recorder (VTR) which synchronizes a tape position identified by a tape address of a playing VTR with that of a recording VTR or with a reference.

Tape address synchronization affecting the playing VTR is required and the recording VTR when a video program delivered from the playing VTR is edited into a predetermined tape position of the recording VTR. As part of the tape address synchronization, a pre-rolling operation is first carried out during which both devices are rolled to an edit point, and simultaneously tape the addresses of both the VTRs are monitored and tape movement is controlled to cause the addresses to coincide with each other. U.S. Patent Appln. Ser. No. 612,685 "TAPE ADDRESS SYNCHRONIZING APPARATUS FOR VIDEO TAPE RECORDER" filed May 22, 1984 now U.S. Pat. No. 4,587,574 discloses an apparatus of this type. In the referenced application, a tape address is produced by using timing pulses which are delivered from a timer roller mechanism. On the other hand, a VTR currently in use derives time code of from respective frames recorded on a magnetic tape from which tape addresses are produced. According to a prior art approach, in the tape address synchronizing operation for the current VTR, the time code is read out as a tape address, and the tape address is compared with a reference address or another time code of another VTR. The comparison results, are used in conjunction with a feedback control which uses a capstan servo circuit to drive the read out time code i.e. tape addresses to match the reference address.

Simultaneously, the capstan servo circuit is also operated such that the phase of a control track (CTL) signal recorded on the magnetic tape coincides with the phase of an external reference signal. In this case, the reference address is produced in comparison to the external reference signal. The reference to the external signal provides an index at which an actual tape address of the magnetic tape should be located. Thus, in such prior art tape address synchronizing apparatus, a first lock-in range is based on comparisons between the tape address and the reference address, and a second lock-in range is based on comparisons between the CTL signal and the external reference signal. Both ranges are independent of each other, and do not necessarily coincide. Therefore, a synchronization error frequently occurred in the tape address synchronization.

SUMMARY OF THE INVENTION

Accordingly, it is an object of the present invention to provide a tape address synchronizing apparatus for a VTR which is capable of completing an accurate tape address synchronizing operation within a pre-roll time, using a time code.

According to the present invention, there is provided a tape address synchronizing apparatus which comprises: control track reading means for reading out a control track signal recorded on said magnetic tape; phase comparing means for comparing the phase of the control track signal read out from the magnetic tape with a phase of the reference signal to generate a phase difference signal; time code reading means for reading out a time code recorded on the magnetic tape to generate a read-out tape address; reference address producing means for producing the reference address in response to the reference signal; address comparing means for comparing the read-out tape address with the reference address to generate an acceleration signal and a deceleration signal in accordance with the comparison result, the address comparing means having a means for generating an acceleration signal or a deceleration signal in accordance with a value of the phase difference signal when the readout tape address coincidences with the reference address; and capstan servo means coupled with the phase comparing means and the address comparing means for controlling the rotational speed of a capstem motor in response to the phase difference signal such that the control track signal and the reference signal become phase synchronized, the capstan servo means accelerating and decelerating the rotational speed of capstan motor in response to the acceleration signal and the deceleration signal. Furthermore, the acceleration or deceleration signal is further related to the amount of a phase difference between the read out control track signal and the reference signal even after the read-out tape address is equal to the reference address.

A further feature of the present invention resides in that control of the rotation of the capstan motor by the phase difference signal is inhibited when the value of the phase difference signal is outside a predetermined range of values.

BRIEF DESCRIPTION OF THE DRAWINGS

FIG. 7 is a schematic diagram of a capstan servo circuit shown in FIG. 3.

DESCRIPTION OF THE PRIOR ART

Figure 1:
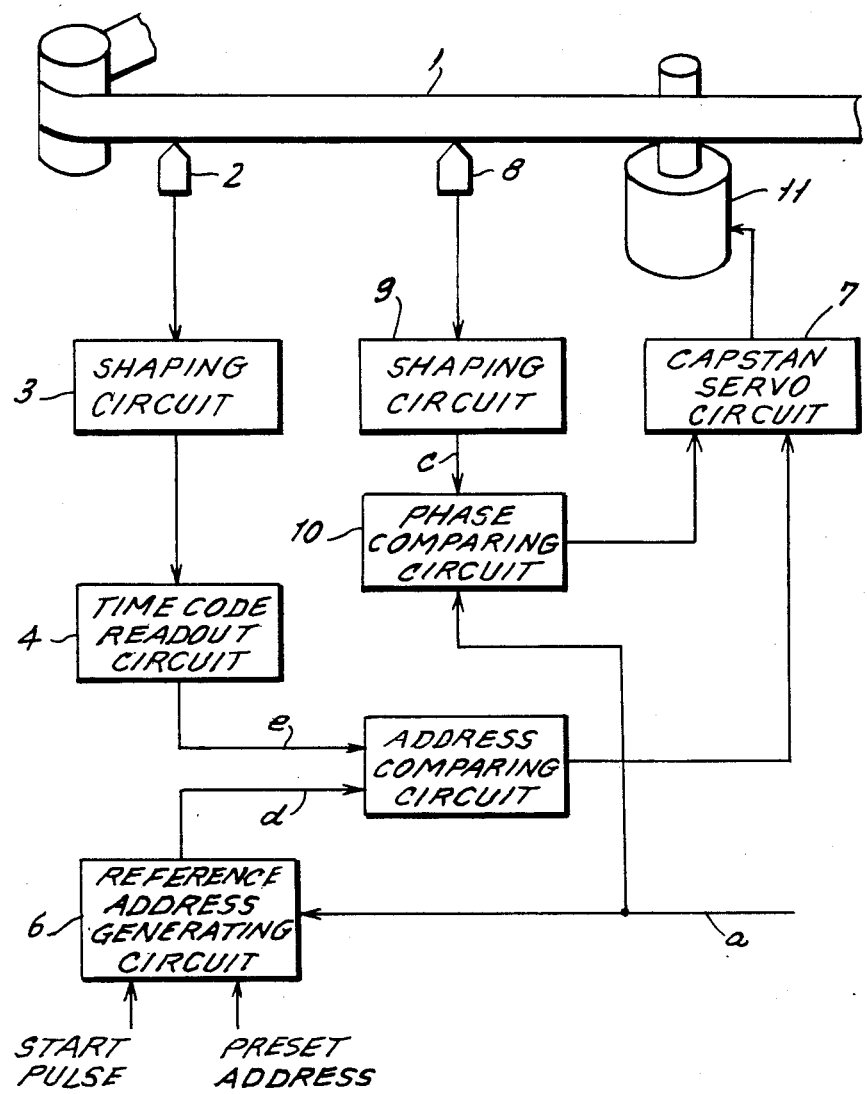
FIG. 1 is a block diagram of a prior art tape address synchronizing apparatus for a VTR.

FIG. 1 illustrates a prior art tape address synchronizing apparatus in which, a time code is read out through a magnetic head 2 and a shaping circuit 3 by a time code read-out circuit 4 from a magnetic tape 1. The time code is sent to an address comparing circuit 5 as a read out tape address e. Meanwhile, a reference address generating circuit 6 generates a reference address d which corresponds to a tape address at which the magnetic tape 1 should be located. The reference address is generated in response to an external reference signal a on the basis of a given preset address and a start pulse. The reference address is supplied to address comparing circuit 5. In address comparing circuit 5, a comparison is made between the tape address e and the reference address d, and an acceleration or deceleration signal is sent to a capstan servo circuit 7 in response to the comparison result.

Independently of the above, a CTL signal c read out by a magnetic head 8 and is sent to a phase comparing circuit 10 via a shaping circuit 9. In the phase comparing circuit 10, the phases of the CTL signal c and the external reference signal a are compared to generate, a phase difference signal which is fed capstan servo circuit 7 which is driven such that the phases coincides with each other. This capstan servo circuit 7 receives respective signals from both the address comparing circuit 5 and the phase comparing circuit 10 to control a capstan motor 11.

Figure 2:
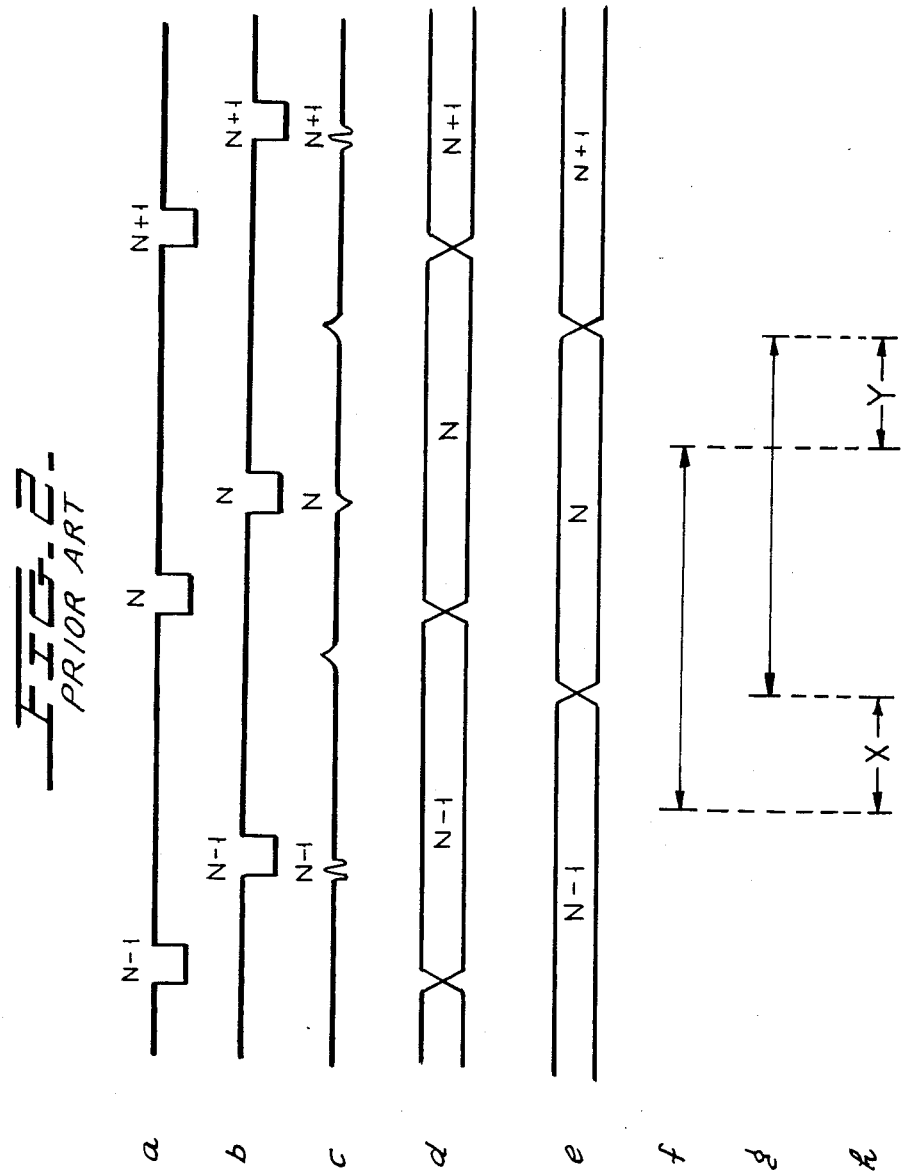
FIG. 2, consisting of a-h, is a timing diagram for explaining the operation of the prior art shown in FIG. 1.

FIG. 2 shows a timing chart in a lock-in state according to the prior art. As seen in FIG. 2, the prior art tape address synchronizing apparatus of FIG. 1, has two lock-in ranges X and Y including a capstan lock-in range f derived from the CTL signal and the reference signal, and an address lock-in range g based on the tape address and the reference address. The two ranges do not fully coincide with each other. For instance, if an address transition point of tape address e from "N-1" to "N" shifts within the range Y, the reference address d and the tape address e coincide with each other at "N", so that the tape transport speed is controlled properly, i.e., the acceleration or deceleration is not effected. On the other hand, since the address "N" of the playing CTL signal c shifts within a range where it is led into the address "N+1" of the capstan servo reference signal b, the phase advances by the capstan servo operation. Therefore, the address "N" of the playing CTL signal c is locked in the address "N+1" of the capstan servo reference signal b. As a result, the phase of the tape address e undesirably advances by one frame period in relation to the address reference d.

As explained above, since the address reference d and the tape address e are compared only by using the television frame period as a unit, an error in the tape address synchronization occurs.

DESCRIPTION OF A PREFERRED EMBODIMENT

Figure 3:
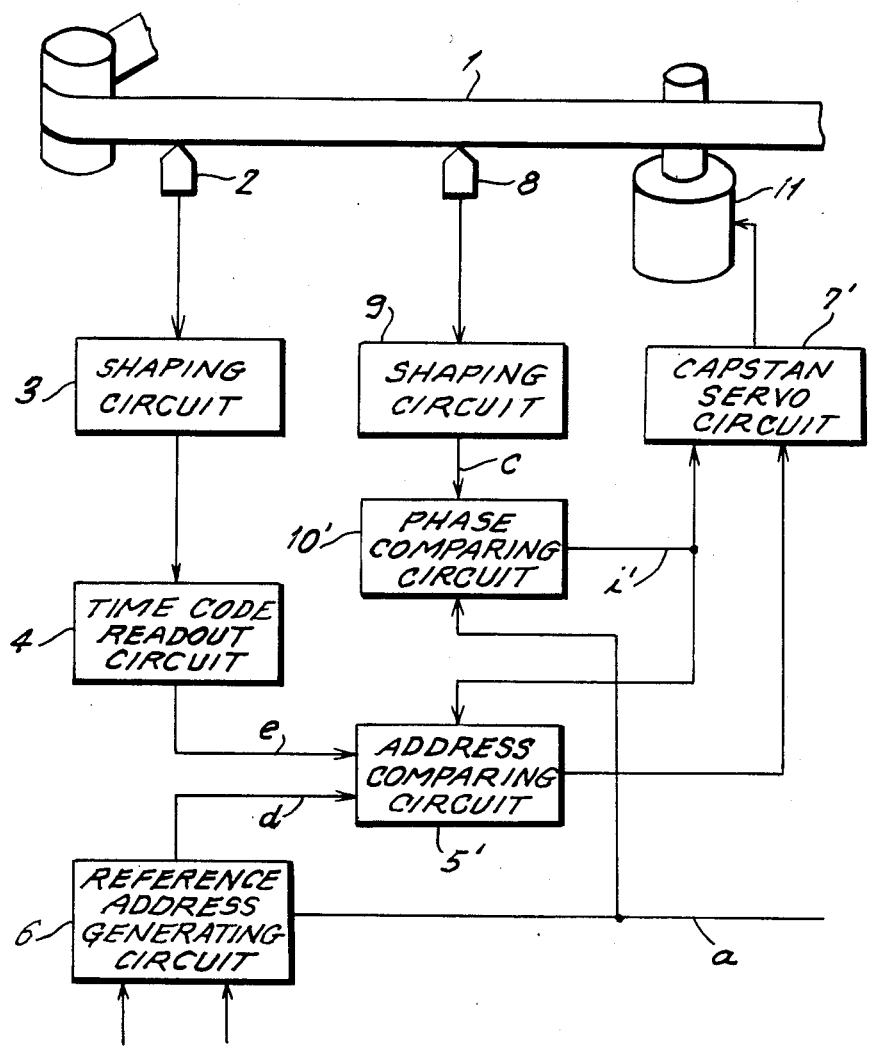
FIG. 3 is a block diagram which illustrates an embodiment of the present invention.
Figure 4:
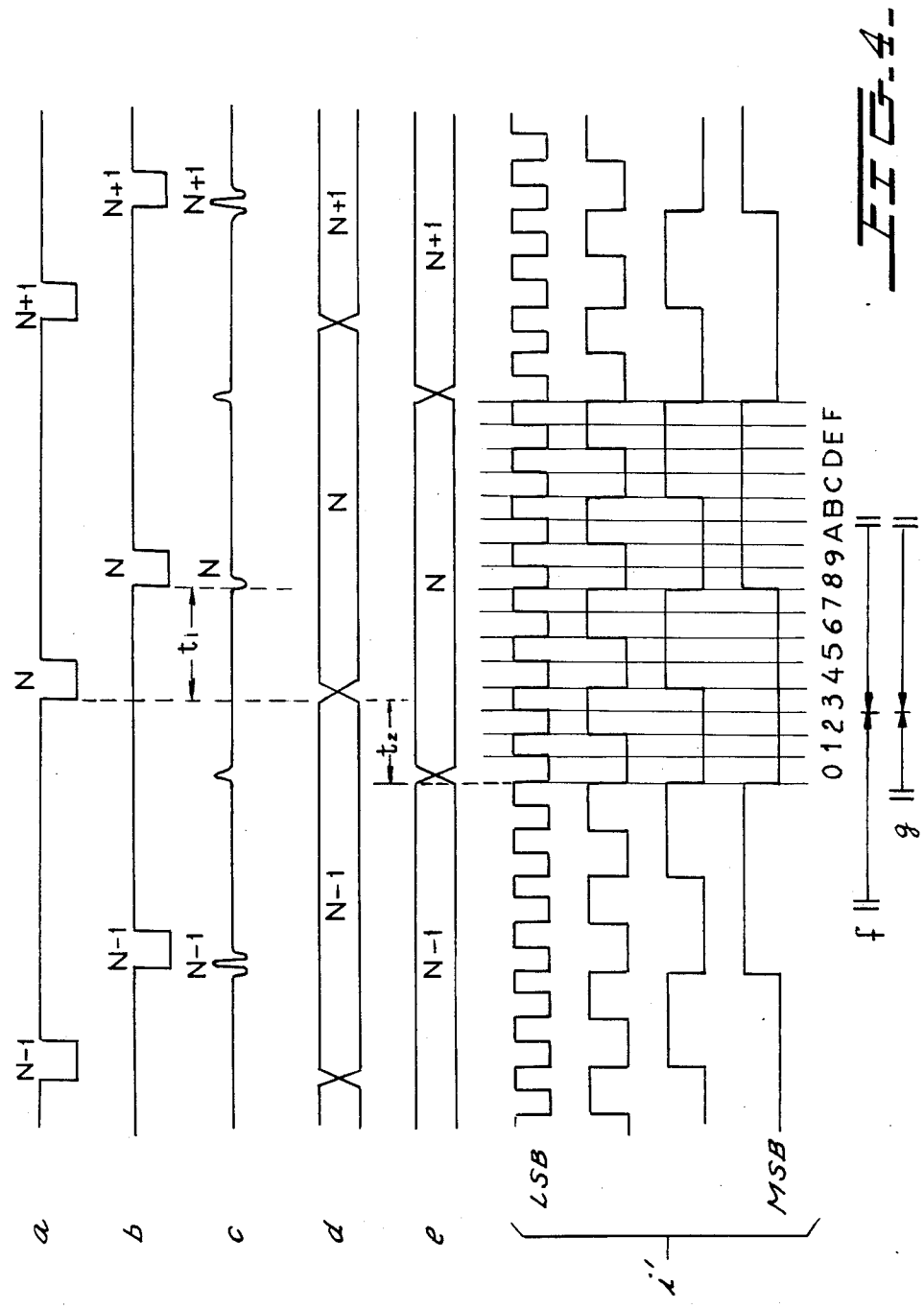
FIG. 4, consisting of a-e, is a timing diagram for explaining the operation of the embodiment shown in FIG. 3.

FIG. 3 is a block diagram which illustrates an embodiment of the present invention. FIG. 4 provides a timing chart applicable to a lock-in state for explaining the operation of the embodiment shown in FIG. 3. One difference between the embodiment of the present invention and the prior art of FIG. 1 is present, in a modified connection of a phase comparing circuit 10' (compare to phase comparison circuit 10 of FIG. 2). A 4-bit phase comparison signal i' is formed in response to a phase difference between the CTL signal c and the phase of the external reference signal a. The signal i' is delivered both to a capstan servo circuit 7' and to an address comparing circuit 5'.

A detailed description of the above embodiment is provided below. A reference preset address is supplied before transportation of the playing magnetic tape, begins. The value of the present address precedes the value of the edit point address by the pre-roll time.

Then, a start pulse is supplied when the tape transport is started, and subsequently the reference address is updated for each frame by a clock pulse of a frame period extracted from the external reference signal a. The reference address d is delivered from the reference address generating circuit 6 to the address comparing circuit 5'.

Figure 5:
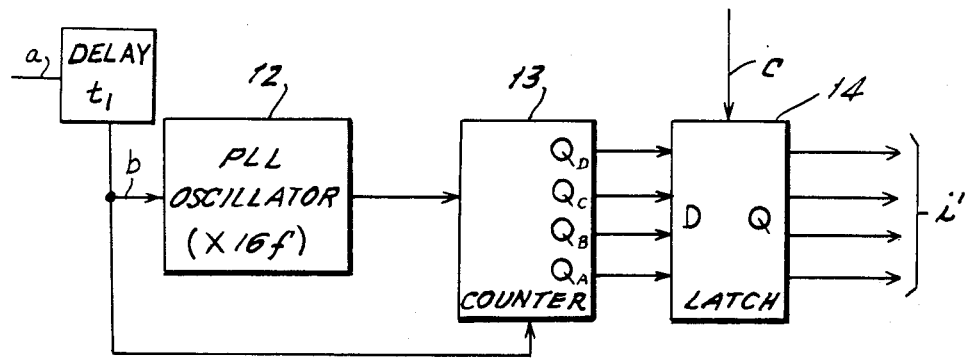
FIG. 5 is a schematic diagram of a phase comparing circuit shown in FIG. 3.

Referring now to FIG. 5, phase comparing circuit 10' is seen to comprise a PLL (phase locked loop oscillator 12, a 4-bit (hexadecimal) counter 13, and a latch circuit 14. The external reference signal a is delayed by a margin time $t_1$ to deliver a delayed external reference signal b. This external reference signal b is supplied to PLL oscillator 12 and 4-bit counter 13. The PLL oscillator 12 generates a having a frequency 16 times that of the incoming signal a or signal of 480 Hz (30 Hz×16). This signal 480 Hz is supplied as a clock signal to the 4-bit counter 13. The 4-bit counter 13 is preset by the external reference signal b with a value "$8_H$" and counts the clock pulses from the PLL oscillator 12 in the hexadecimal range "$0_H$", "$F_H$". The count value of the 4-bit counter is supplied to latch circuit 14, which stores the count value during the active state of the CTL signal c from the CTL shaping circuit 9. The output of latch 14 is signal i'.

Figure 6:
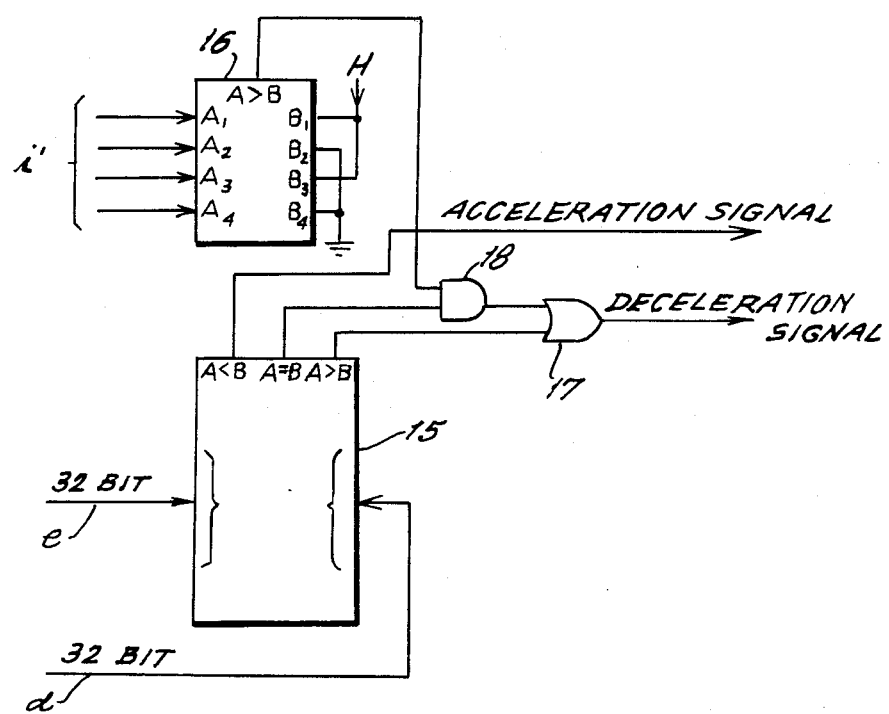
FIG. 6 is a schematic diagram of an address comparing circuit shown in FIG. 3.

Next address comparing circuit 5' of the present embodiment is described with reference to FIG. 6. The address comparing circuit 5' comprises a 32-bit comparator 15, a 4-bit comparator 16, an OR gate 17, and an AND gate 18. The tape address e and the reference address d are compared by the comparator 15. When the tape address e is smaller than the reference address d, an acceleration signal is output from an A<B terminal. On the other hand, when the tape address e is greater than the reference address d, the output of the A>B terminal provides a deceleration signal via OR gate 17. When the tape address e is equal to the reference address d, AND gate 18 is enabled. In this case, when the 4-bit signal i', which is the input signal of the comparator 16, is equal to or greater than hexadecimal "$B_H$" i.e., when the signal i' is between "$B_H$" and "$F_H$" a signal is delivered from an A>B terminal of the comparator 16 to other input of the gate 18. A deceleration signal is produced by AND gate 18 and supplied via OR gate 17 as part of the declaration signal. In the embodiment of the present invention, when the tape address e and the reference address d are equal, and the signal i' is less than "$A_H$", neither the acceleration signal nor the deceleration signal is active.

Capstan servo circuit 7', as shown in FIG. 7, reacts upon receipt of the acceleration signal, by supplying a voltage $$\frac{R_2 + R_3}{R_1 + R_2 + R_3} \cdot V$$

from a voltage divider comprised of resistors $R_1$, $R_2$, and $R_3$. The voltage is supplied to drive amplifier 18 via switch SW1. In addition, upon receipt of the deceleration signal, capstan servo circuit 7' supplies a voltage of $$\frac{R_3}{R_1 + R_2 + R_3} \cdot V$$

to drive amplifier 18 via switch SW2. Capstan motor 11 is accelerated or decelerated in response to the applied voltage. Furthermore, when neither the acceleration or deceleration signal is present, an output of a servo circuit 19, which receives the signal i', is supplied to drive amplifier 18 via a switch SW3. A gate 20 controls the activation of switch SW3 to close the switch when neither the acceleration nor the deceleration signal is applied. The servo circuit 19 includes a D/A converter for converting the 4-bit signal i' to an analog signal and also includes a time constant circuit for providing a predetermined servo characteristic.

The manner of the operation of the foregoing embodiment is now described by reference to FIG. 4. For purposes of description only, it is assumed that the VTR used in the embodiment is a SMPTE type C format VTR. In the figure, the duration of a time period $t_1$ that separates the external reference signal a from the capstan servo reference signal b is about ¼ frame. The time period $t_2$ measured from the time tape address e is established to the time external reference signal a is established, also corresponds to approximately ¼ frame. In addition, the phase comparison signal i' is a 4-bit digital signal which has a resolution of a 1/16 frame.

Now, when the phase of the capstan servo reference signal b and that of the playing CTL signal c coincide (during locked-in), the phase comparison signal i' will be equal to "H"$_H$ (the subscript H denotes that the number is a hexadecimal number). When the phase of the playing CTL signal c has advanced with respect to the capstan servo reference signal b, the phase comparison signal a' is in the range "9"$_H$ to "F"$_H$ in response to a phase difference. On the other hand, when the phase of the playing CTL signal c is delayed with respect to the capstan servo reference signal b, the phase comparison signal i' ranges between "7"$_H$ to "0"$_H$.

It is possible to determine the position of the magnetic tape to a resolution of 1/16 frame on basis of the phase comparison signal i'. Thus, in the address comparison circuit 5', it becomes possible to fine control the address lock-in range g, making it possible to optimize the address lock-in range g in relation to the capstan lock-in range f. In other words, it is possible to eliminate range Y shown in FIG. 2.

Referring to FIG. 4, if the address lock-in range g is set from "O"$_H$ to "A"$_H$ of the phase comparison signal i', the address lock-in range g is included in the capstan lock-in range f.

When the tape transport is commenced, address comparison circuit 5' compares tape address e delivered from time code read-out circuit 4 and reference address d. Based on the comparison result, the acceleration or the deceleration signal is applied to the capstan servo circuit 7' until they coincide with each other. For instance, if tape address e has advanced beyond reference address d, the deceleration signal is output. As a result, tape address e and reference address d will coincide with each other. During the time when they are coincident, phase comparison signal i' is further checked. If phase comparison signal i' is in the range "B"$_H$ to "F"$_H$ i.e., the present position of the tape is advanced in relation to the capstan servo reference signal b, the deceleration signal is delivered. When phase comparison signal i' is in the range "O"$_H$ to "A"$_H$, the deceleration signal is not delivered. As a result, the phase of capstan servo reference signal b and that of playing CTL signal c are caused to become coincident with each other, and the tape address synchronization operation is thereby completed. When the output of the address comparison circuit means a normal speed except the acceleration signal and the deceleration signal, and when the phase comparison signal i' thus shows "O"$_H$ to "A"$_{H'}$ the capstan motor 11 is locked-in and the tape address e and the reference address d, i.e., the current address and the reference address, coincide with each other.

In accordance with the present invention, when the value of the phase comparison signal (phase difference signal) is within the predetermined range, for example, "O"$_H$ to "A"$_H$, the capstan servo control is carried out the same way as in the prior art. However, when the value of the phase comparison signal is outside the predetermined range, for example, "B"$_H$ to "F"$_H$, the capstan servo control which uses the phase comparison signal is inhibited even if the tape address coincides with the reference address. Instead, the capstan motor is decelerated so that the value of the phase comparison signal is within the predetermined range, i.e., "O"$_H$ to "A"$_H$.

Although the resolution of the phase detection signal i' is a 1/16 frame, it is possible to implement the present invention with other resolution values.

In addition, when the phase-relationships among phase reference signal a, capstan servo reference signal b, playing CTL signal c, reference address d, and tape address e are as shown in FIG. 4, an optimal address lock-in range g is obtained in the range "O"$_H$ to "A"$_H$. However, even when the phase relationship of the aforementioned respective signals differs from that shown in FIG. 4, the present invention can be implemented if the optimum address lock-in range g is determined.

As described above, the present invention has advantages in that tape address synchronization errors in the VTR can be reduced and the capstan lock-in time, can be shortened by using the phase comparison signal, which resolves one frame period into a plurality of detective periods, in addition to the tape address comparison result.

What is claimed is:

1. A tape address synchronizing apparatus for a video tape recorder for synchronizing a tape address of a magnetic tape to a reference address, comprising:
   control track reading means for reading a control track signal recorded on said magnetic tape;
   phase comparing means for comparing a phase of said control track signal read from said magnetic tape to a phase of a reference signal and for generating a phase difference signal representative of the phase difference between said control track signal and said reference signal;
   time code reading means for reading out a time code recorded on said magnetic tape and for generating a read-out tape address therefrom;
   reference address producing means for producing said reference address based on said reference signal;
   address comparing means for comparing said read-out tape address to said reference address and for generating an acceleration signal and a deceleration signal based upon the result of the comparison, said address comparing means generating said acceleration signal or said deceleration signal based on a value of said phase difference signal when said read-out tape address equals said reference address; and
   capstan servo means coupled to said phase comparing means and to said address comparing means for controlling the rotation of a capstan motor in response to said phase difference signal such that the phases of said control track signal and said reference signal are synchronized to one another, said capstan servo means accelerating and decelerating the rotation of said capstan motor in response to, respectively, said acceleration signal and said deceleration signal.

2. A tape address synchronizing apparatus as claimed in claim 1, wherein said phase comparing means includes:

oscillating means for producing a clock signal having a frequency equal to n-times the frequency of said reference signal, n being an integer number;

counting means for counting said clock signal to deliver a count value, said counting means being cleared by said reference signal; and latch means for latching said count value during the occurrence of said control track signal to deliver a latched value which is representative of said phase difference signal.

3. A tape address synchronizing apparatus as claimed in claim 1, wherein said address comparing means includes:

a first comparator for comparing said read-out tape address to said reference address to produce said acceleration signal when said read-out tape address is smaller than said reference address, a coincident signal when said read-out tape address is equal to said reference address, and said deceleration signal when said read-out tape address is greater than said reference address;

a second comparator for comparing a value of said phase difference signal to a predetermined value and for generating a modifying signal based on the result of said comparison; and modification means for producing said acceleration signal or said deceleration signal based on the state of said coincident signal and said modifying signal.

4. A magnetic tape recording and reproducing apparatus comprising:

means for detecting a time code recorded on a magnetic tape and for producing a tape address based on said time code;

means for counting an external reference signal to produce a reference address;

comparing means for comparing said tape address to said reference address to produce a first acceleration signal and a first deceleration signal based on the result of said comparison;

means for reading out a control track signal recorded on said magnetic tape and for producing a read-out control track signal from said recorded signal;

means for detecting the phase difference between said read-out control track signal and said external reference-signal to produce a phase difference signal; and means for determining whether said phase difference signal is outside a predetermined range and for outputting a control signal indicative thereof;

means for delivering a second acceleration signal or a second deceleration signal in response to said control signal;

first control means responsive to said first acceleration and deceleration signals and said second acceleration or deceleration signals for controlling the translational speed of said magnetic tape; and second control means for controlling the translational speed of said magnetic tape in accordance with said phase difference -signal during a time when both said first and second acceleration signals and said first and second deceleration signals are in an inactivated state.

5. A tape address synchronizing apparatus for a video tape recorder for synchronizing a tape address of a magnetic tape to a reference address, comprising:

control track reading means for reading out a control track signal recorded on said magnetic tape;

phase comparing means for comparing a phase of said control track signal to a phase of a reference signal to generate a phase difference signal representative of the phase difference between said control track signal and said reference signal;

time code reading means for reading out a time code recorded on said magnetic tape and for generating a read-out tape address from said time code;

reference address producing means for producing said reference address from said reference signal;

address comparing means for comparing said read-out tape address to said reference address to generate an acceleration signal and a deceleration signal based on the result of said comparison;

capstan servo means for controlling the rotation of a capstan motor in response to said phase difference signal such that said control track signal becomes synchronized in phase to said reference signal, said capstan servo means being further operative to accelerate or decelerate the rotation of said capstan motor in response to said acceleration signal and said deceleration signal, respectively; and inhibiting means for inhibiting control of the rotation of said capstan motor by said phase difference signal whenever the value of said phase difference signal is outside a predetermined value range.

6. A tape address synchronizing apparatus as claimed in claim 5 further comprising a further means coupled to said inhibiting means and to said capstan servo means, said further means being operative for decelerating the rotation of said capstan motor when said value of said phase difference signal is outside said predetermined value range.

7. A tape address synchronizing apparatus as claimed in claim 5, wherein said inhibiting means includes means for inhibiting control of the rotation of said capstan motor by said phase difference signal in response to any one of said acceleration signal and said deceleration signal.

8. A tape address synchronizing apparatus as claimed in claim 7, wherein said address comparing means includes:

a first comparator for comparing said read-out tape address to said reference address to produce said acceleration signal when said read-out tape address is smaller than said reference address, for producing a coincident signal when said read-out tape address is equal to said reference address, and for producing said deceleration signal when said read-out tape address is greater than said reference address;

a second comparator for determining whether the value of said phase difference signal is outside said predetermined value range and for generating a modifying signal when the value of said phase difference signal is outside said predetermined value range; and modification means for producing said acceleration signal or said deceleration signal in response to said coincident signal and said modifying signal.

* * * * *